United States Patent [19]
Galbraith et al.

[11] Patent Number: 5,752,717
[45] Date of Patent: *May 19, 1998

[54] INFLATABLE METAL BLADDERS FOR AUTOMOBILE PASSENGER PROTECTION

[75] Inventors: Lyle D. Galbraith, Redmond; John R. Italiane, Seattle, both of Wash.

[73] Assignee: Primex Technologies Inc., Redmond, Wash.

[*] Notice: The term of this patent shall not extend beyond the expiration date of Pat. No. 5,615,914.

[21] Appl. No.: 785,643

[22] Filed: Jan. 17, 1997

Related U.S. Application Data

[62] Division of Ser. No. 373,333, Jan. 17, 1995, Pat. No. 5,615,914.

[51] Int. Cl.⁶ ............................................. B60R 21/16
[52] U.S. Cl. ............................ 280/743.1; 280/730.2
[58] Field of Search .................... 280/743.1, 728.1, 280/748, 751, 730.1, 730.2

[56] References Cited

U.S. PATENT DOCUMENTS

| | | |
|---|---|---|
| 1,235,550 | 8/1917 | Carmody . |
| 3,404,813 | 10/1968 | Waxman . |
| 3,764,174 | 10/1973 | Taninecz . |
| 3,768,830 | 10/1973 | Hass . |
| 3,791,667 | 2/1974 | Haviland . |
| 3,814,458 | 6/1974 | Acs . |
| 3,888,502 | 6/1975 | Felzer et al. . |
| 3,990,726 | 11/1976 | Oka et al. . |
| 4,050,537 | 9/1977 | Bez . |
| 4,176,858 | 12/1979 | Kornhauser . |
| 4,264,018 | 4/1981 | Warren . |
| 5,094,476 | 3/1992 | Chihaya . |
| 5,106,137 | 4/1992 | Curtis . |
| 5,107,767 | 4/1992 | Schneider et al. . |
| 5,180,188 | 1/1993 | Frantz et al. . |
| 5,277,441 | 1/1994 | Sinnhuber . |
| 5,308,112 | 5/1994 | Hill et al. . |
| 5,316,336 | 5/1994 | Taguchi et al. . |
| 5,322,322 | 6/1994 | Bark et al. . |
| 5,324,070 | 6/1994 | Kitagawa et al. . |
| 5,324,072 | 6/1994 | Olson et al. . |
| 5,333,898 | 8/1994 | Stutz . |
| 5,447,326 | 9/1995 | Laske et al. . |

FOREIGN PATENT DOCUMENTS

| | | |
|---|---|---|
| 42 09 944 A1 | 5/1993 | Germany . |
| 2-237837 | 9/1990 | Japan ........................ 280/743.1 |
| 404356245 A | 12/1992 | Japan . |
| 405024494 A | 2/1993 | Japan . |
| 2 225 291 | 5/1990 | United Kingdom . |

*Primary Examiner*—Paul N. Dickson
*Attorney, Agent, or Firm*—Gregory S. Rosenblatt; Wiggin & Dana

[57] ABSTRACT

There is disclosed a metallic bladder that is inflated by a gaseous stream generated by a gas generator. The inflatable metallic bladder is useful as a side impact air bag for motorized vehicles. The heat dissipating capability of the metallic bladder permits the use of energetic chemical compositions that generate a high temperature gas and very rapidly inflate the metallic bladder. The heat conducted by the gas is dissipated by the metallic bladder avoiding harm to occupants.

11 Claims, 6 Drawing Sheets

INFLATABLE METAL BLADDERS FOR AUTOMOBILE PASSENGER PROTECTION

CROSS-REFERENCE TO RELATED APPLICATION

This patent application is a division of U.S. patent application Ser. No. 08/373,333 by Lyle D. Galbraith et al. that was filed on Jan. 17, 1995, and is now U.S. Pat. No. 5,615,914.

BACKGROUND OF THE INVENTION

1. Field of the Invention

This invention relates to inflatable air bags for use as an automobile passenger restraint in the event of an automobile collision. More particularly, a metal bladder is inflated by a gas generator when the automobile is struck with excessive force.

2. Description of the Related Art

Front mounted air bags that inflate in an automobile collision are mounted in the steering wheel column, the glove box or the dashboard of many motorized vehicles. In the event of a front end collision, the air bags are inflated by a gas and substantially fill that portion of the passenger compartment not occupied by the driver or a passenger. The combination of a seat belt and an air bag is effective to restrain an automobile passenger in the event of a front end collision, minimizing the likelihood of severe injury.

Front mounted air bags, while highly effective for front end collisions, are less effective for side impact collisions and collisions occurring at more than 30° from a front end collision. Accordingly, there is a need to provide automobiles with air bags effective to restrain a passenger in a side impact collision.

U.S. Pat. No. 5,308,112 to Hill et al discloses a fabric air bag for side impact collisions. The air bag is mounted within a door panel in an unfurled, deflated position. The unfurled bag deploys more quickly and provides more reliable orientation than air bags stored in a rolled, furled or coiled state.

U.S. Pat. No. 5,316,336 to Taguchi et al discloses a rubber or fabric air bag for providing passenger restraint in the event of a side impact collision. The air bag is mounted in a door panel above a gas generator. On impact, the bag is unfurled and extends laterally upward along the inside of the door. The orientation of the air bag relative to the gas generator provides more efficient use of generated gas and more rapid inflation of the air bag.

The rate of deployment of a fabric or rubber air bag is limited. These flexible fabric bags can not tolerate high inflation gas temperatures. At higher temperatures, the bag may burn exposing the passengers to hot gas.

Fabric air bags are also designed to vent gases into the vehicle interior. Therefore, the chemical composition of the gas generator used to inflate the air bag must be limited to compositions that generate non-toxic gases at relatively low temperature. The gas stream further may not contain excessive amounts of solid particles or flammable gases.

The flexibility of fabric air bags is a detriment. The air bags must be precisely folded or supported in a specific orientation to ensure rapid deployment. Over extended periods of time, as the automobile is subject to the bumps and centrifugal force of normal driving, it is possible for the flexible air bag to shift position and effective deployment of the air bag impaired.

Another method to protect the occupants in a collision is the use of energy absorbing structural components mounted in hollow sections of the automobile such as inside the door panel, under the hood or in the trunk adjacent to the bumper.

U.S. Pat. No. 3,888,502 discloses energy absorbing components for an automobile. Hollow drawn or spot welded tubes are filled with plastic beads and inserted into the walls of the automobile. The plastic beads absorb impact energy and cause a more uniform, controlled collapse of the hollow members.

U.S. Pat. No. 4,050,537 to Bez, discloses a hollow metallic member installed within an automobile wall. On impact, the hollow member is pressurized, typically by an explosive charge, deforming the walls of the hollow metallic member outward to increase resistance to buckling.

These structural elements, while effective, are of limited value. The polymer beads have a volumetric weight of 75–150 $kg/m^3$ and contribute undesirable weight to the automobile. Structural members that can withstand an explosion without bursting must be carefully designed and protected from corrosion, heat and other strength reducing conditions.

The above problems with both side impact air bags and internal structural members are solved by the use of an inflatable metal bladder. Inflatable metal bladders to disperse munitions have been disclosed in U.S. Pat. No. 5,107,767 to Schneider et al. However, that patent is oriented toward providing propulsive forces to propel munitions and does not suggest mechanisms under which metallic bladders may be used to restrain or otherwise protect an automobile passenger.

There remains a need for an air bag assembly utilizing an inflatable metal bladder that does not suffer from the problems of the prior art.

SUMMARY OF THE INVENTION

Accordingly, it is an object of the invention to provide a metallic bladder that inflates in the event of an automobile collision. It is a feature of the invention that the metallic bladder is particularly suited as a side impact air bag, as an inflatable knee bolster to prevent lower leg injuries, as a structural member inserted within the automobile or as a bumper.

Among the advantages of the invention are that the inflatable metallic bladder is more robust than a fabric or rubber air bag and is not porous. The metallic bladder does not shift during operation of the automobile and is not likely to rupture. Since the metallic bladder is not porous, the constituents of the gas stream need not meet as strict toxicity standards as when a porous, fabric bag is employed. The result is a greater selection of energetic gas generating compounds may be employed.

Another advantage of the invention is that the metallic bladder is not flammable and high temperature gases may be used for inflation. The use of a high temperature gas permits faster deployment at higher gas pressure and reduces the mass of gas generating chemicals needed for inflation. This reduces the size and weight of the inflation mechanism.

In accordance with the invention, there is provided an air bag assembly for a motorized vehicle. This assembly includes an inflatable metal bladder and a gas generator. The gas generator generates a gaseous stream when the motor vehicle is struck with excessive force. A conduit directs the gaseous stream to the inflatable metal bladder.

The above mentioned objects, features and advantages, as well as others, will become more apparent from the specification and drawings that follow.

DETAILED DESCRIPTION

Figure 1:
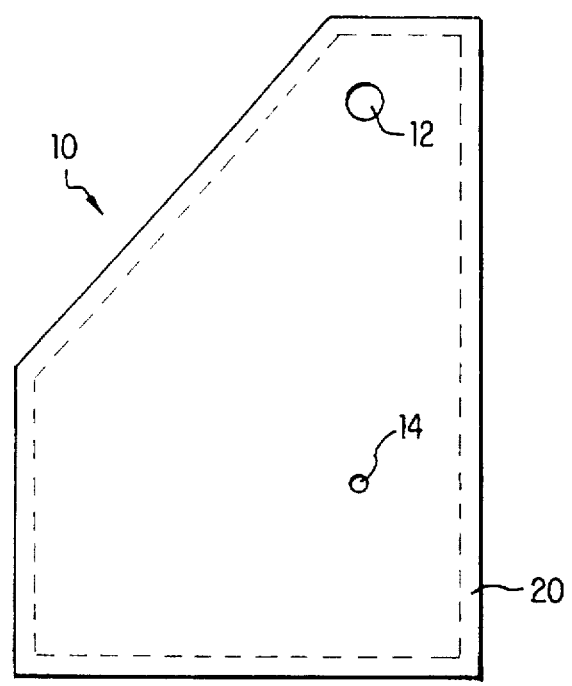
FIG. 1 shows a metallic bladder in accordance with the present invention.

FIG. 1 shows in planar view a metallic bladder 10 in accordance with the invention. The metallic bladder 10 is formed from a thin sheet of metal capable of plastic deformation that melts at a temperature above 600° C. and preferably, the metal melts at a temperature in excess of 1000° C. The gas used to inflate the metallic bladder 10 may enter the bladder at temperatures of up to about 2200° C. (4000° F.). The low heat capacity of the gas combined with the excellent heat dissipating characteristics of the metallic bladder 10 prevents melting of the bladder.

Suitable materials for the metallic bladder 10 include copper, copper alloys such as brass (copper/zinc alloys), aluminum, aluminum alloys and various iron based alloys such as low and medium carbon steel and stainless steel. The sheets have a thickness of from about 0.1 millimeter to about 0.75 mm (0.004–0.030 inch). The preferred thickness is from about 0.15 mm to about 0.30 mm (0.006–0.012 inch).

Thicknesses below these minimums are difficult to resistance weld and result in delicate elements that are difficult to assemble and maintain within an automobile. Materials thicker than these maximums produce very stiff structures when inflated and do not provide optimum attenuation characteristics when in contact with the automobile occupants.

Where the inflatable metal bladders 10 are to be mounted external to the automobile to serve as stiffening members, such as internally pressurized front, rear and side bumpers, thicker sheets of metal are preferred to enhance robustness.

For corrosion resistance and ease of resistance welding, stainless steel is most preferred.

The metallic bladder 10 is formed into a desired shaped such as a disk or a rectangle. Using conventional metal shaping techniques, thin sheets of metal may be formed into complex shapes to match the contours of the automobile such as door interiors, door panels, dash boards, windshield headers, knee bolsters, etc. Apertures may be formed in the metal sheet for providing an ingress site 12 for the inflation gas or a vent hole 14.

Figure 2:
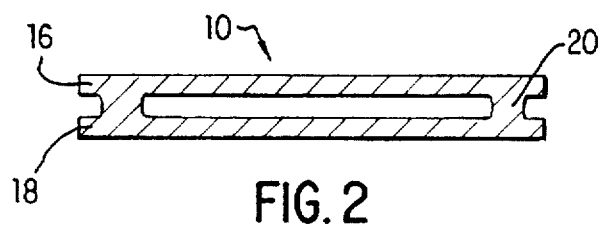
FIG. 2 shows in cross-sectional representation a first embodiment of the metallic bladder of FIG. 1.

With reference to both FIGS. 1 and 2, the metallic bladders 10 are formed by welding together a first 16 and a second 18 metal sheet. The edges of the sheets are most effectively joined by a melt down edge weld or machine rolling resistance weld 20. Welding is preferred over brazing, soldering and joining methods using an additional bonding agent. The edge joints are subject to peeling loads when the bladder is inflated. Bonding agents do not have the capacity to resist these peel loads. Also, bladder edge welds can be accomplished very rapidly when using machine resistance roll welders which result in economical bladder construction.

Figure 3:
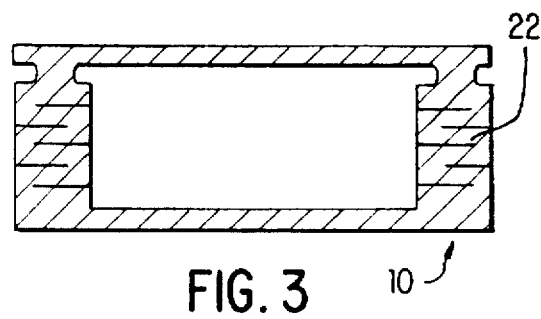
FIG. 3 shows in cross-sectional representation a second embodiment of the metallic bladder of FIG. 1.

To enhance the volume occupied by the inflated bladder, one or both of the metal sheets may include a folded portion 22 as illustrated in FIG. 3. This portion may be folded accordion style or in any other easily opened pattern. Because the metal is more rigid than a fabric or rubber, the folded section 22 will not shift during normal operation of the automobile.

Figure 4:
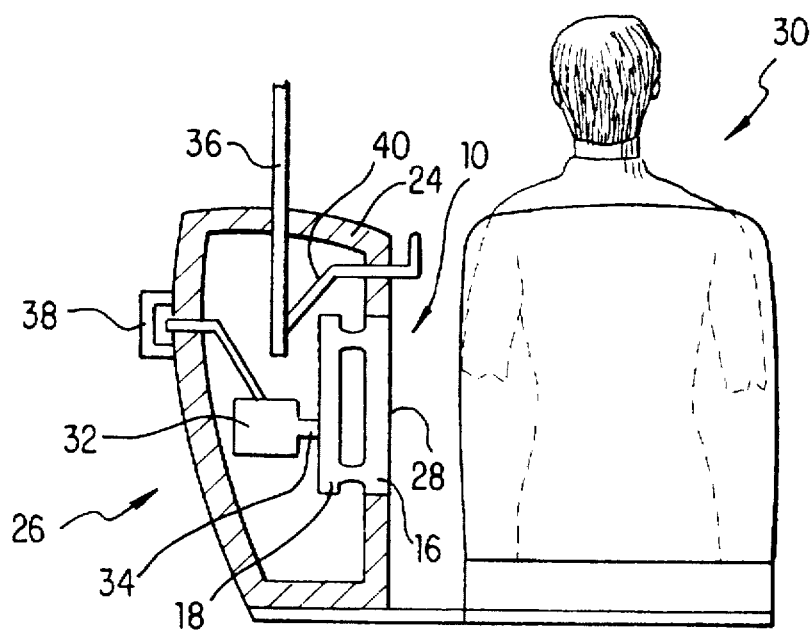
FIG. 4 illustrates a metallic bladder as a side impact air bag prior to deployment.

FIG. 4 illustrates the metallic bladder 10 as a side impact air bag. The first metal sheet 16 forms a portion of the panel 24 forming a car door 26. The surface 28 of the first metal sheet 16 exposed to the automobile occupant 30 may be exposed as decorative trim or covered with a fabric, leather or wood veneer.

Attached to the second metal sheet 18 is a gas generator 32. The gas generator produces a voluminous stream of gases when ignited. Typically, a sensor (not shown) mounted in the automobile sends an activating signal to an electric igniter when the automobile is struck at excessive force. Due to the low heat capacity of the gas generated by the gas generator and the excellent thermal dissipation capacity of the metal constituting the first metal sheet 16 and second metal sheet 18, an energetic compound such as nitrocellulose may be used in the gas generator 32.

When a nitrocellulose base gas generant is ignited, a large volume, about 4 moles of gas per gram, is generated. The gas is at an elevated temperature and inflates the bladder 10 in less than about 15 milliseconds. By optimizing the chemical composition and positioning of a conduit 34 that directs the gas stream to the metallic bladder 10, inflation times of under 5 milliseconds have been achieved.

Any gas generating chemical composition that generates a copious volume of gas in a few milliseconds may be employed. Typically, the gas stream generated is at an elevated temperature on the order of from about 600° C. to about 2200° C.

The metallic bladder 10 is much more resistant to tearing than a fabric or rubber air bag. The occupant 30 is not likely to be exposed to the gases generated by the gas generator 32. Since the gas is contained in a non-porous bladder, it is acceptable to employ gases that exceed previous exhaust toxicity levels. Flammable gas can also be considered in view of the enhanced containment.

The higher allowable temperature of the gas results in a lower mass of propellant gases being required to inflate the metallic bladder, minimizing the size of the gas generator 32 and simplifying construction. The gas generator 32 does not require cooling screens or other devices to reduce the inflation temperature of the gas. Reducing the size of the inflator, limits the interference of the metallic bladder 10 with operation of the automobile window 36, door handle 38 or linkages 40 that actuate these components.

Figure 5:
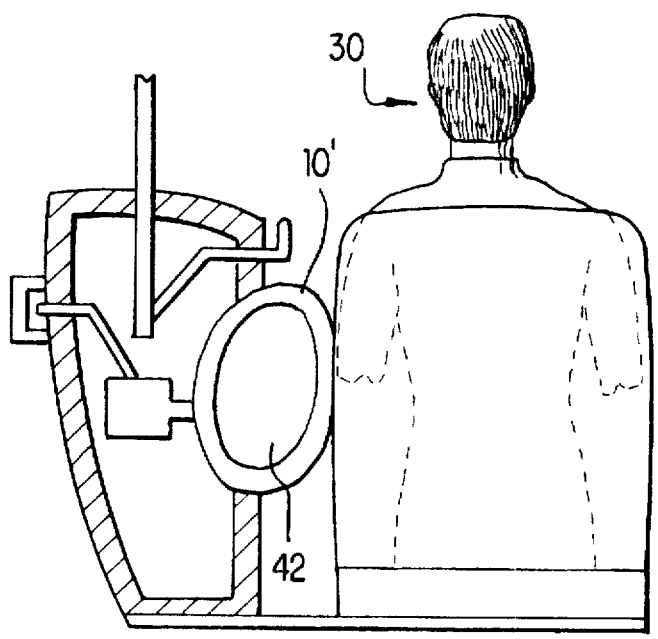
FIG. 5 illustrates the metallic bladder of FIG. 4 after deployment.

FIG. 5 illustrates the metallic bladder 10' after inflation. The metallic bladder 10' extends inward into the passenger compartment forming a restraining surface for the occupant 30. For use as a side impact air bag, an inflation pressure of from about 5 psig to about 50 psig and preferably from about 10 psig to about 40 psig is used.

Figure 6:
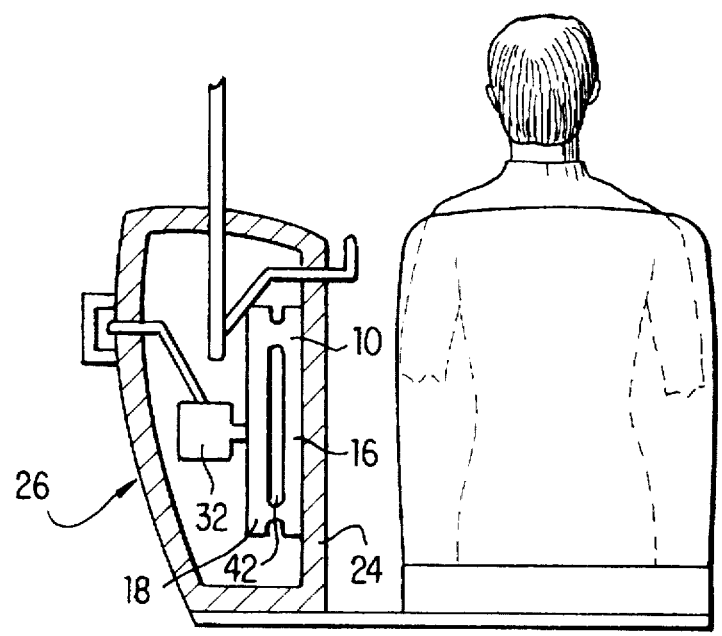
FIG. 6 shows a second embodiment of the metallic bladder as a side impact air bag prior to deployment.

FIG. 6 illustrates the metallic bladder 10 mounted behind the panel 24 in a second embodiment of the invention. With this embodiment, the automobile manufacturer does not have to change the outline of the panel 24. The first metal sheet 16 is bonded to the panel 24 by any suitable means such as by welding, brazing, soldering or bolting. The gas generator 32 is actuated when the automobile is impacted with sufficient force to inflate the separation 42 between the first metal sheet 16 and second metal sheet 18.

Figure 7:
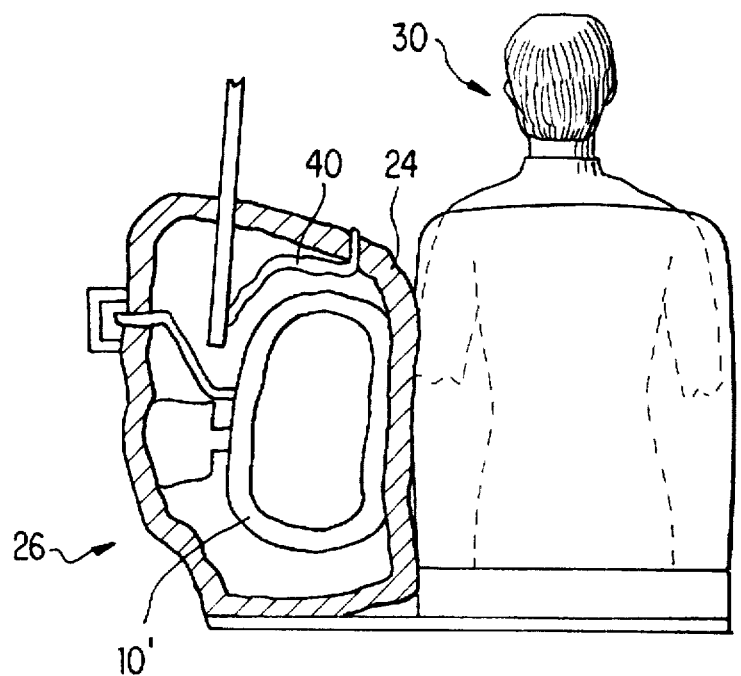
FIG. 7 shows the air bag of FIG. 6 after deployment.

As illustrated in FIG. 7, when the metallic bladder 10' is deployed, the panel 24 is distorted. The panel is usually coated with a decorative trim such as leather or fabric that restrains the occupant 30. This embodiment likely results in destruction of the car door 26 and damage to the linkage 40. However, the car doors are usually damaged in a side impact collision so this damage is tolerable.

Figure 8:
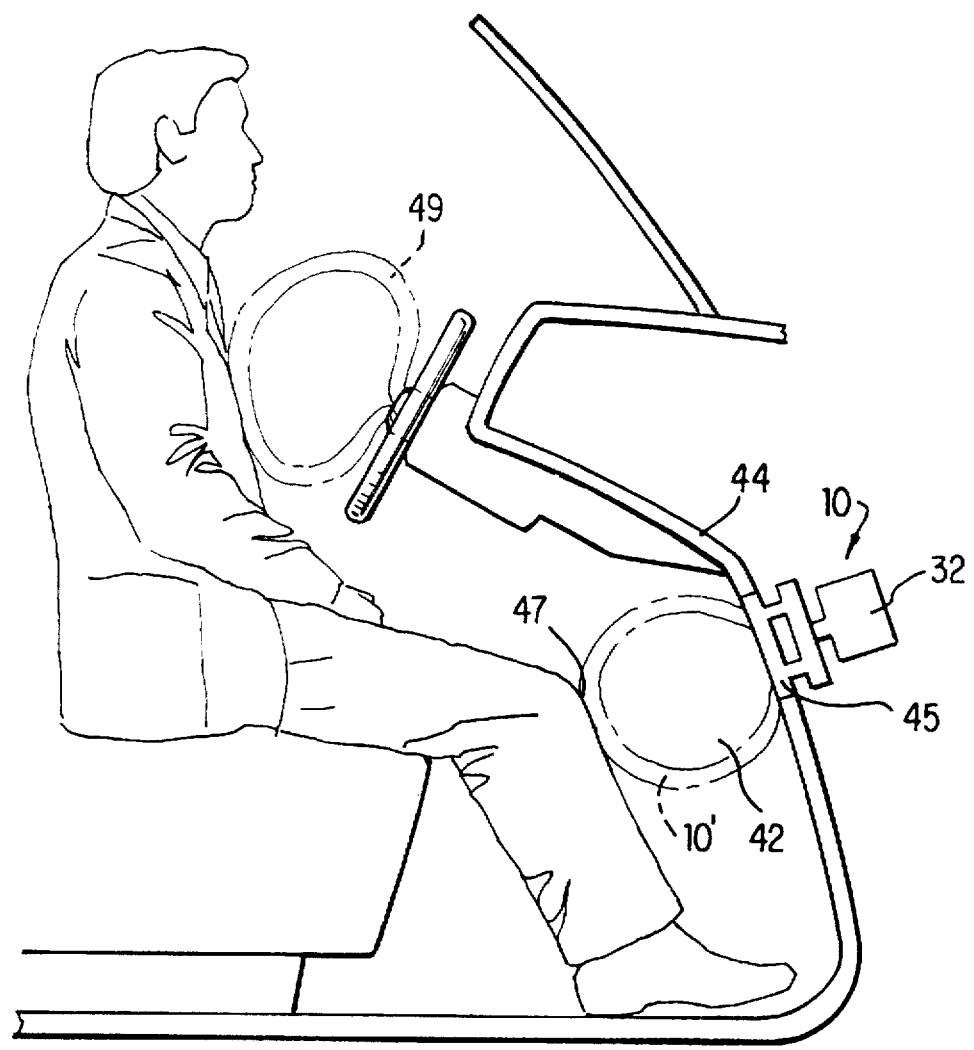
FIG. 8 shows a metallic bladder used as a knee bolster to reduce lower leg injuries and to assist in occupant positioning.

In FIG. 8, the metallic bladder 10 is mounted underneath a dash board 44 and is either integral with a padded knee bolster 45 or disposed behind the padded knee bolster. The metallic bladder 10 is rapidly inflated in a collision. The inflated knee bolster 10' offers improved energy absorption. The under dash knee bolster inflates more rapidly, typically in from about 3 to about 10 milliseconds, than the driver or passenger front mounted air bag 49 and the automobile passenger is prevented from submarining under the front mounted air bag 49.

The occupant's legs are more rigid than the occupant's sides, so the gas generator 32 delivers a higher inflation pressure to the separation 42 than utilized in the side impact metallic bladder described above. Preferably, the inflation pressure to deploy the air bag 10' is from about 20 psig to about 150 psig and more preferably from about 25 psig to about 75 psig.

Figure 9:
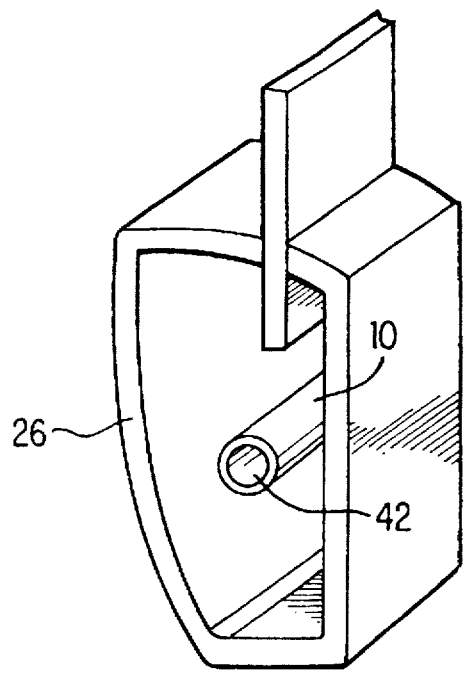
FIG. 9 shows an inflatable structural member mounted in an automobile door.
Figure 10:
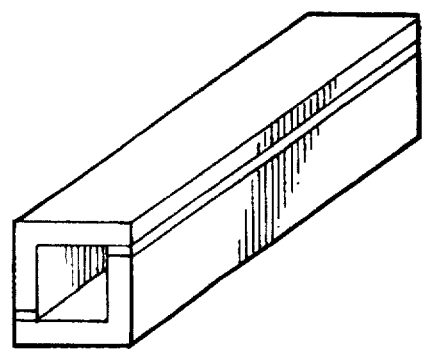
FIG. 10 shows in isometric view a second inflatable structural member.

FIG. 9 illustrates another application of the inflatable metallic bladders of the invention. The metallic bladder 10 is a hollow beam that may be formed by conventional tube drawing or by welding as illustrated in FIG. 10. The hollow beam is easily stored within the confines of an automobile door 26 and does not interfere with the door and window operation. The hollow beam 10 is light weight and does not significantly contribute to the overall weight of the automobile. The uninflated hollow beam 10 does not provide significant lateral stiffness. However, when the hollow beam is deployed to an internally pressurized tubular structure, it affords considerable strength addition to the door.

While the door interior and exterior may be deformed and the window and door linkages displaced or destroyed during inflation of the hollow beam, these elements would have probably been ruined by a side impact event anyway. The rapid inflation of the internally pressurized hollow beam assists in deceleration of the object striking the automobile and increases the stiffness of the automobile door, both effects contribute to minimize the likelihood of occupant harm during the collision.

A conventional air bag generator (not shown) is connected to the hollow beam 10 through a conduit. For maximum stiffness, the air bag preferably generates a pressure within the separation 42 of from about 2000 psig to about 5000 psig.

Figure 11:
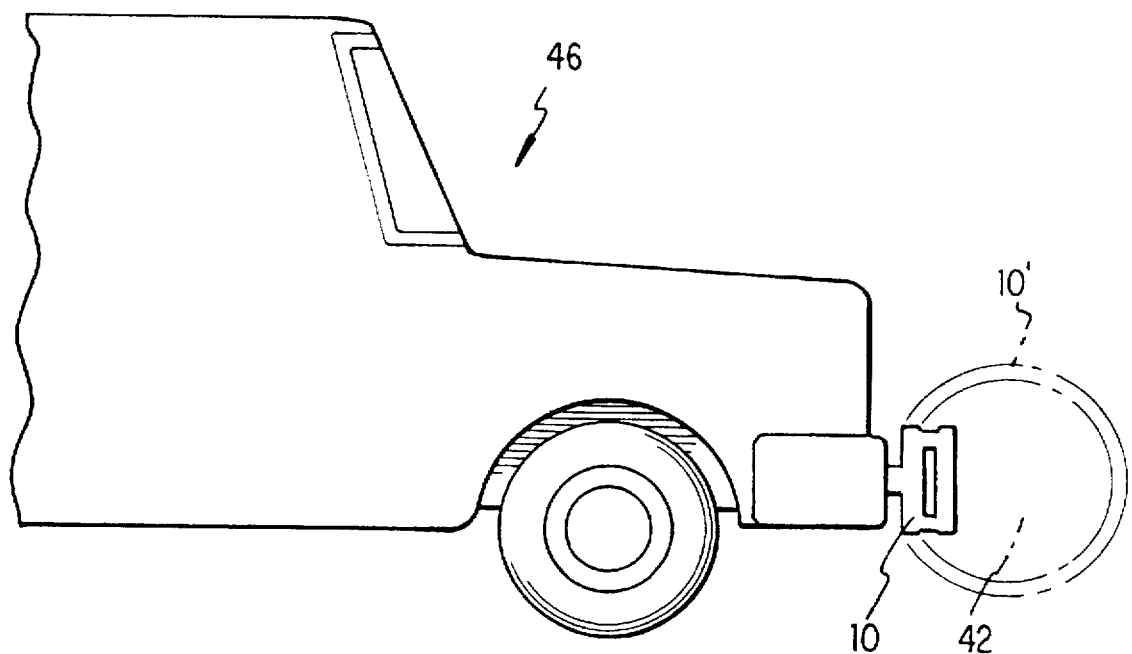
FIG. 11 shows the use of a metallic bladder as an automobile bumper.

In FIG. 11, the metallic bladder 10 forms the bumper of an automobile 46. On impact, the metallic bladder 10 inflates to the position 10' with the separation 42 pressurized to at least 2000 psig and preferably from about 5000 psig to about 10,000 psig. Inflation of the metallic bladder 10' decelerates the object striking the automobile 46 and provides cushioning, minimizing the impact of the collision.

While the metallic bladders of the invention have been described in reference to automobiles, they are useful restraint devices for other types of motorized vehicles as well. Such other motorized vehicles include, but are not limited to planes, boats and trucks.

It is apparent that there has been provided in accordance with this invention an inflatable metallic bladder that fully satisfies the objects, means and advantages set forth hereinbefore. While the invention has been described in combination with specific embodiments thereof, It is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A passenger restraint system in combination with a motorized vehicle, comprising:

an inflatable metal bladder mounted to said motorized vehicle, wherein said metal bladder has a first metal sheet joined to a second metal sheet, both said first metal sheet and said second metal sheet having a thickness of from about 0.004 inch to about 0.030 inch, wherein said inflatable metal bladder is effective to both restrain an occupant and to attenuate injury to said occupant in the event of a collision;

a gas generator that generates a gaseous stream when actuated, said gaseous stream having a temperature of from about 600° C. to about 2200° C.;

a conduit to direct said gaseous stream to said inflatable metal bladder and thereby inflate said inflatable metal bladder; and a sensor mounted to said motorized vehicle to actuate said gas generator.

2. The passenger restraint system of claim 1 wherein said first metal sheet is joined to said second metal sheet with an inflatable separation disposed there between.

3. The passenger restraint system of claim 2 wherein said inflatable separation is defined by a weld bead joining said first metal sheet to said second metal sheet.

4. The passenger restraint system of claim 2 wherein said inflatable separation is deformed by the combination of a weld bead and a folded portion of at least one of said first sheet and said second sheet.

5. The passenger restraint system of claim 2 wherein said first metal sheet is mounted to a surface of a door panel of said motorized vehicle.

6. The passenger restraint system of claim 5 wherein said inflatable separation is inflated to a pressure of from about 5 psig to about 50 psig.

7. The passenger restraint system of claim 2 wherein said inflatable metal bladder is mounted within a hollow body part of said motorized vehicle.

8. The passenger restraint system of claim 7 wherein said inflatable metal bladder is mounted within a door of said motorized vehicle.

9. The passenger restraint system of claim 8 wherein said inflatable separation is inflated to a pressure of from about 2000 psig to about 5000 psig.

10. The passenger restraint system of claim 2 wherein said inflatable metal bladder is mounted underneath a dash board of said motorized vehicle.

11. The passenger restraint system of claim 10 wherein said inflatable separation is inflated to a pressure of from about 20 psig to about 150 psig.

\* \* \* \* \*